July 13, 1965   R. N. HAYNIE ETAL   3,193,884
MOLD FOR MULTIPLE-LIP SEAL
Original Filed Jan. 29, 1962   2 Sheets-Sheet 1

July 13, 1965   R. N. HAYNIE ETAL   3,193,884
MOLD FOR MULTIPLE-LIP SEAL
Original Filed Jan. 29, 1962   2 Sheets-Sheet 2

3,193,884
MOLD FOR MULTIPLE-LIP SEAL
Robert N. Haynie, Los Altos, and Lloyd E. Voss, Redwood City, Calif., assignors to Federal-Mogul-Bower Bearings, Inc., Detroit, Mich., a corporation of Michigan
Original application Jan. 29, 1962, Ser. No. 169,683. Divided and this application May 4, 1964, Ser. No. 368,753
7 Claims. (Cl. 18—42)

This application is a division of application Serial No. 169,683, filed January 29, 1962.

This invention relates to improvements in single-molded multi-wafer radial lip seals of the type having an integral annular metal reinforcement member, and to improvements in apparatus for the manufacture of such seals.

Apparatus for making single-molded multi-wafer lip seals is shown in U.S. Patent 2,982,997, and the resulting product claimed in pending patent application Serial No. 780,479, filed December 15, 1958, now abandoned, has proven to be practical for both internal lip and external lip designs. By the patented apparatus it is possible to eliminate flash from the sealing lips, but there has remained a problem of tearing the lips at one or more points near their roots during removal of the seal from the mold. While tearing can be avoided by using a lost-motion arrangement that is described in the patent, there are great process advantages to eliminating such lost motion and to holding the mold washers in a fixed position; then, however, lip tearing becomes a major source of rejection of both internal and external designs, the external design being especially liable to lip tearing.

We have found the cause of this lip tearing problem: the axial movement needed to pull the lips out from the mold results in a squeezing or pinching action on the lips at points where two or more lips are compressed in thickness while they lie one on top of the other. Moreover, we have, by the present invention, been able to overcome this problem. This we do by staggering the lengths of the lips so that the space through which the lips must pass as they are taken out of the mold grows progressively larger with successive lips. In a preferable form of the invention, it is adequate to lengthen successive lips as little as one-half the thickness of each lip, progressively for each lip, but larger amounts are also suitable.

We also provide a much easier path for the lip to follow as it comes out of the mold, by molding the lip in a structure that has in place of a full radius at the root between each lip a larger lip radius in the direction in which the lip is dragged out of the mold and a minimum radius on the side of the lip that lies on the other side of the mold. In this way the lip is drawn past a larger radius. This feature compensates at the same time for the slight shortening of the lips, substituting a much smaller and sharper radius on the other or upper side of the mold. By application of the invention, considerable improvement in molding and a greatly reduced loss in the number of parts damaged by extraction from the mold has been achieved.

Other objects and advantages of the invention will appear from the following description of some preferred embodiments thereof.

Figure 4:
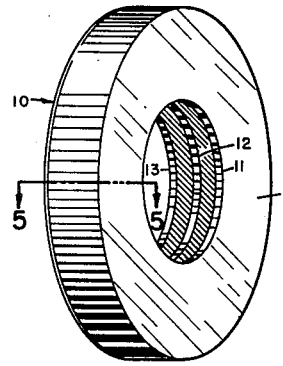
FIG. 4 is a view in perspective of a product made by the mold of FIGS. 1–3.
Figure 5:
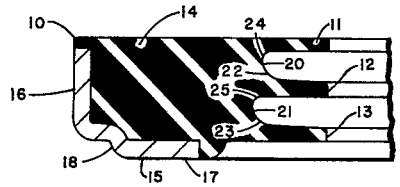
FIG. 5 is a fragmentary enlarged view of a section along the line 5—5 in FIG. 4.

The product of this invention (see FIGS. 4, 5, 8 and 9) is a multiple-lip radial shaft seal. The seal 10 of FIGS. 4 and 5 has three wafer-type radial lips, 11, 12 and 13, extending radially inwardly from an elastomeric body 14 to a common inner diameter or periphery which is somewhat smaller than shaft size. A continuous annular metal reinforcement member 15 is molded into the elastomeric body 14 and therefore is an integral part of the finished seal 10. The metal member 15 may have an axially extending generally cylindrical portion 16 and a generally radially extending portion 17 having in this instance (but not essentially) an offset 18. The body 15 is bonded to the radially inner face of the portion 16 and the axially inner face of the portion 17. The three successive lips 11, 12 and 13 are joined by two successive roots 20 and 21. As shown in FIG. 5, it will be seen that the lips 11, 12 and 13 are of different radially outward lengths, being progressively longer. This lip 12 is longer than the lip 11 by at least half the width of the lips 11 or 12, and the lip 13 is longer than the lip 12 by the same amount. At the roots 20 and 21 there is not a semicircle but a relatively large radius portion 22, 23 on the side toward the next larger lip, and a much shorter radius portion 24 or 25 on the side toward the smaller lip. For example, the radius of the portions 22, 23 may be more than twice that of the portions 24, 25.

Figure 1:
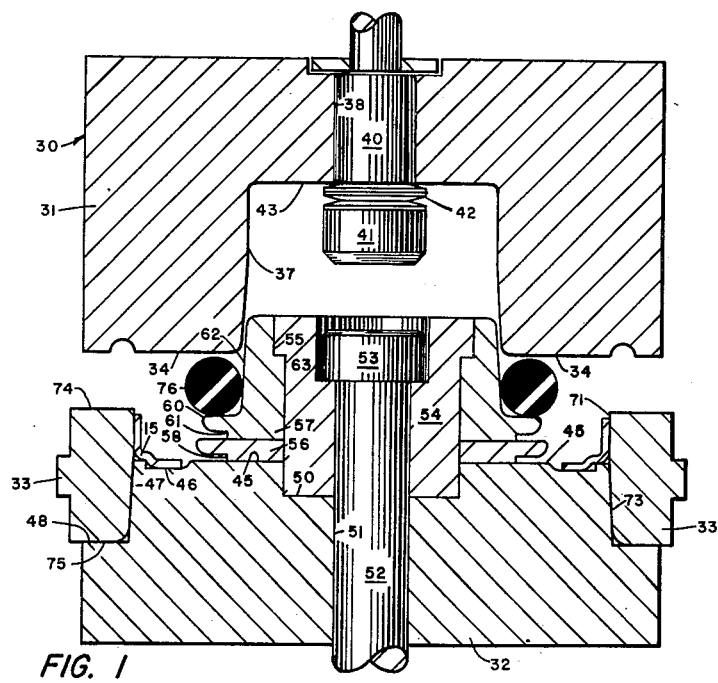
FIG. 1 is a view in elevation and in section of a mold embodying the principles of the invention with the parts in a position just prior to the mold being closed.
Figure 2:
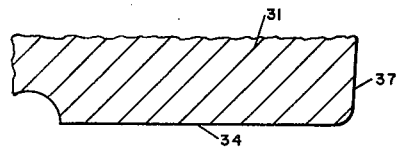
FIG. 2 is a fragmentary enlarged view in elevation and in section of a portion of the mold of FIG. 1 showing the mold fully closed during molding.
Figure 2:
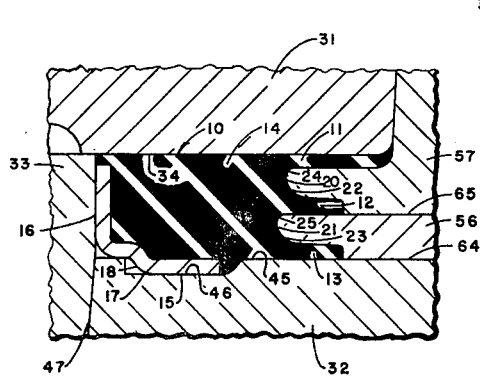
Figure 3:
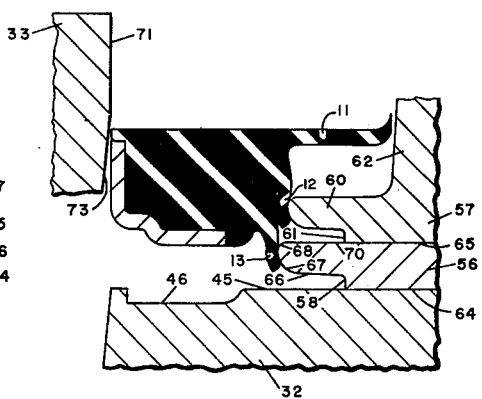
FIG. 3 is a fragmentary view similar to FIG. 2 of the same mold during the pulling of the mold apart and withdrawal of the molded seal.
Figure 3A:
FIG. 3A is a detail view of a portion of FIG. 3 at an earlier stage of withdrawal of a lip from a cavity.

A mold 30 for making the seal 10 is shown in FIGS. 1–3. The mold 30 includes an upper mold member 31, a lower mold member 32, and an outer annular mold member 33. The upper mold member 31 has a lower mold surface and a central generally axial recess 37 with an axial opening 38 through which extends a cap screw 40 with an enlarged head or cap 41, a spring 42 lying between the head 41 and the radial surface 43 of the recess 37.

The lower mold member 32 has an upper mold and parting surface 45, an annular recessed case-receiving portion 46, an outer axially extending portion 47, and an outer bearing portion 48. The lower mold member 32 also has a central generally axial recess 50 and a central opening 51 through which extends a cap screw 52. The cap screw 52 has an enlarged head 53 that bears on an annular core 54 seated in the central recess 50, the core 54 having a flange 55. Between the core 54 and the lower mold member 32 are a plurality of insert members 56 and 57, the lower insert member 56 being a flat washer recessed to provide a step 58 which provides the longest lip 13. The upper insert member 57 has a washer-like portion 60 with a step 61 for providing the medium length lip 12 and a sleeve-like portion 62 which, on closing of the mold 30 engages the recess 37 in a way that spaces the portion 60 from the surface 34 to provide the third and shortest lip 11 which is later trimmed to the proper length. The member 57 also has a step 63 on its inner periphery engaged by the flange 55 so that the insert members are held tightly to the lower mold member. There is a parting line 64 between the lower insert member 56 and the lower mold member 32 and a parting line 65 between the two insert members 56 and 57. In accordance with the invention in Patent No. 2,982,997, no flash forms at the parting lines 64 and 65 because the hydraulic pressure of the rubber is used when closing the mold to overbalance the ability of the rubber to flow in between the mold parts at the part lines, even though gas does escape through the part lines 64 and 65, in order that the rubber (a synthetic elastomer usually) can completely fill the cavity and provide sharply molded lips 12 and 13.

The mold inserts 56, 57 are shaped to provide the needed radii 22, 23, 24, 25. Thus, each insert 56, 57 has a lower planar face 66 joined by a larger radius portion 67 to a shorter radius portion 68 leading to the parallel face 70 on the upper side. With this particular construction it is not necessary to have any lost-motion connection between the mold member 32 and the insert members 56 and 57, or to have the insert members 56, 57 move apart when the mold is opened.

The outer mold member 33 has a cylindrical portion 71 above a frusto-conical portion 73. It has an upper radial face 74 and a lower radial face 75.

When closing the mold 30, the annular outer mold member 33 is seated with its face 75 on the bearing portion 48 of the lower member 32, and the upper member 31 comes down with its bearing portion 34 on top of the face 74 of the member 33. A ring 76 of "prep" (as uncured elastomeric annuli of this type are called) is initially seated on top of the insert member 57, and the reinforcement member 15 is seated in the portion 46 of the member 32. (The "prep" 76 is not shown to scale, it would obviously be larger, but the location is the point illustrated.) The elastomer flows into and fills the recesses as shown in FIG. 2. The core 54 and the cap screw 52 hold the insert members 56 and 57 very snugly against the lower mold element 32 and prevent flash along the part lines 64, 65 while gas is still able to escape through these part lines.

As shown in FIG. 3, when parting the mold 30, the upper mold half 31 moves up away from the lower mold half 32, and the insert washers 56, 57 and the outer mold part 33 stay together with the member 32 during this movement. During this time the three lips 11, 12, 13 are pulled out of their molding recesses. Because of their different lengths and their arrangement of radii they overlap as shown in FIG. 3 rather than coming all on top of each other. The space through which the lips 11, 12 and 13 pass grows successively larger, due to the successively shorter lips, as considered when the lips are pulled out; at the same time, the long radii 22, 23 on the lower parts of each lip helps, and so there is no tearing.

One further feature should be mentioned. It will be noticed in FIG. 3 that the face 66 diverges from the radial plane so that it converges slightly toward the face 70. The amount of divergency is preferably small, between 1 and 5 degrees being preferable. This small divergence helps to release the lips from the mold without changing their generally rectangular shape to any significant degree. The skin friction between the molded lip and the mold face 67 is lessened to enable the radial pull needed to detach the lip from the face 67 without tearing the lip or leaving part of it adhered to the face 67. The lip 11 is then trimmed to length.

Figure 9:
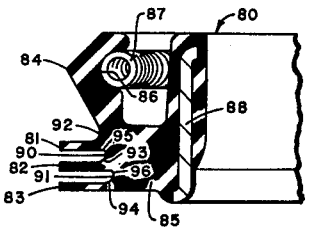
FIG. 9 is a fragmentary enlarged view in section taken along the line 9—9 in FIG. 8.
Figure 8:
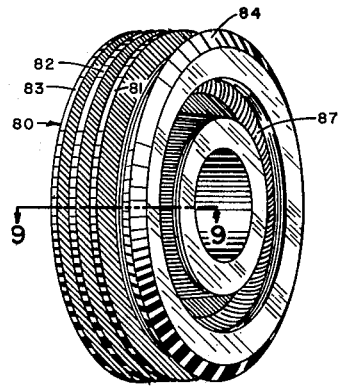
FIG. 8 is a view in perspective of the product of the mold of FIGS. 6 and 7.

A seal 80 shown in FIGS. 8 and 9 differs from the seal 10 in having lips 81, 82, 83, 84 that extend radially outwardly from an elastomeric body 85 to seal against a bore instead of a shaft. The lips 81, 82, 83 are radial and wafer-like and successively longer, radially inwardly from a common outer diameter. The lip 84 is larger, is of the V-type, and has an annular recess 86 that receives a spring 87 to insure contact of the lip 84 with a bore. There is, again, an annular metal reinforcing member 88, which here is shown as substantially cylindrical with pinched off ends.

The lips 81, 82, 83 are joined by successive roots 90 and 91, and the lip 81 has a root 92 leading to the lip 84. Each root 90, 91 has a relatively large radius portion 93, 94 on the side toward the longer lip and a relatively small radius portion 95, 96 on the side toward its shorter lip.

Figure 6:
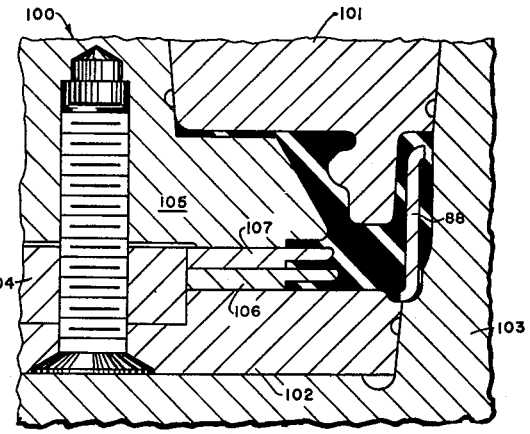
FIG. 6 is a view in elevation and in section of another form of mold embodying the principles of the invention, shown in fully closed position.
Figure 7:
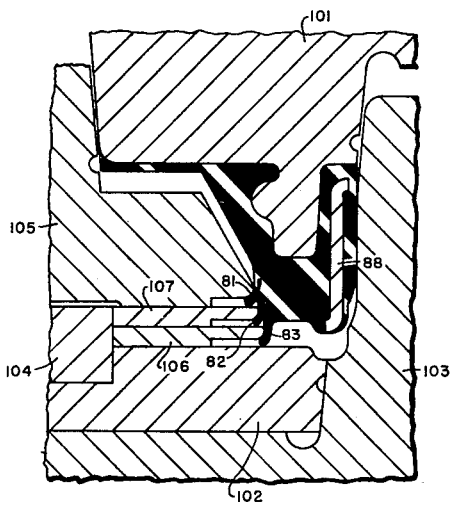
FIG. 7 is a view similar to FIG. 3 of the mold of FIG. 6.

Essential features of a mold 100 for making the seal 80 are shown in FIGS. 6 and 7. There is an upper mold member 101, a lower mold member 102, an inner core 103, an outer member 104, a ring 105, and two washer-like inserts 106 and 107. The inserts 106 and 107 and the ring provide the needed root and lip shape, with the longest wafer lip 83 on the bottom and the shortest wafer lip 83 joined to the lip 84. Once again, there is room for escape of gases between the inserts 106 and 107 and between them and the adjacent members 102 and 105, while flash is prevented by the tightness with which these members fit, being lapped to do so. Upon opening, the successive shortness of the lips 83, 82, 81 as pulled up, enable pulling without causing excessive confinement or breaking.

The face of the mold cavity corresponding to the face 67 of the mold 30 is again preferably slightly divergent from the radial plane toward the opposite face to enable the lip to be pulled out of the cavity with less skin friction opposing the pull. The lip 84 is later trimmed to shape. This exterior-type seal 80, an especially difficult product to make, attests the value of the mold of this invention.

To those skilled in the art to which this invention relates, many additional changes in construction and widely differing embodiments of the invention will suggest themselves without departing from the spirit and scope of the invention as defined in the claims.

What is claimed is:

1. A mold for making multiple-lip radial shaft seals, comprising an upper mold element, a lower mold element, an outer ring bounding the outer periphery of the mold cavity and seating between the holding apart said upper and lower mold elements, and a plurality of insert washers between said upper and lower mold elements seating against said mold elements when said mold is closed, said washers and mold elements having mating surfaces, at least one of each pair of surfaces being stepped at a common distance from an axis to provide (1) a plurality of generally rectangular cross-section mold cavity portions between them, with a parting line for each cavity portion so that gas is released from each said cavity portion through said parting lines, and (2) a lip-separating portion having an extremity where each lip joins the main body of elastomer, said extremities being at successively different distances from said axis so that the lips molded thereby are successively longer and, when said seal is extracted from said mold, can be pulled from said mold cavity portions without fracture 2. The mold of claim 1 wherein the said extremities differ successively by at least one-half the width of said mold cavity portions.

3. The mold of claim 1 wherein said extremities have, on one side, a large radius portion and, on the other side, a small radius portion merging into said large radius portion.

4. The mold of claim 3 wherein said large radius portion is at least twice the radius of said small radius portion.

5. The mold of claim 3 wherein said large radius portions lie on the same side of each extremity as the step.

6. The mold of claim 3 wherein the face of the cavity portion on the same side as said large radius portion diverges slightly from the radial plane toward the opposite surface of said washer when moving from said large radius portion toward said extremity.

7. The mold of claim 6 where the divergence is between 1 and 5 degrees.

References Cited by the Examiner
UNITED STATES PATENTS

| | | | |
|---|---|---|---|
| 2,982,997 | 5/61 | Peickii | 18—42 |
| 3,004,298 | 10/61 | Haynie | 264—266 XR |
| 3,079,632 | 3/63 | Peickii. | |

WILLIAM J. STEPHENSON, *Primary Examiner.*